United States Patent Office 3,141,245
Patented July 21, 1964

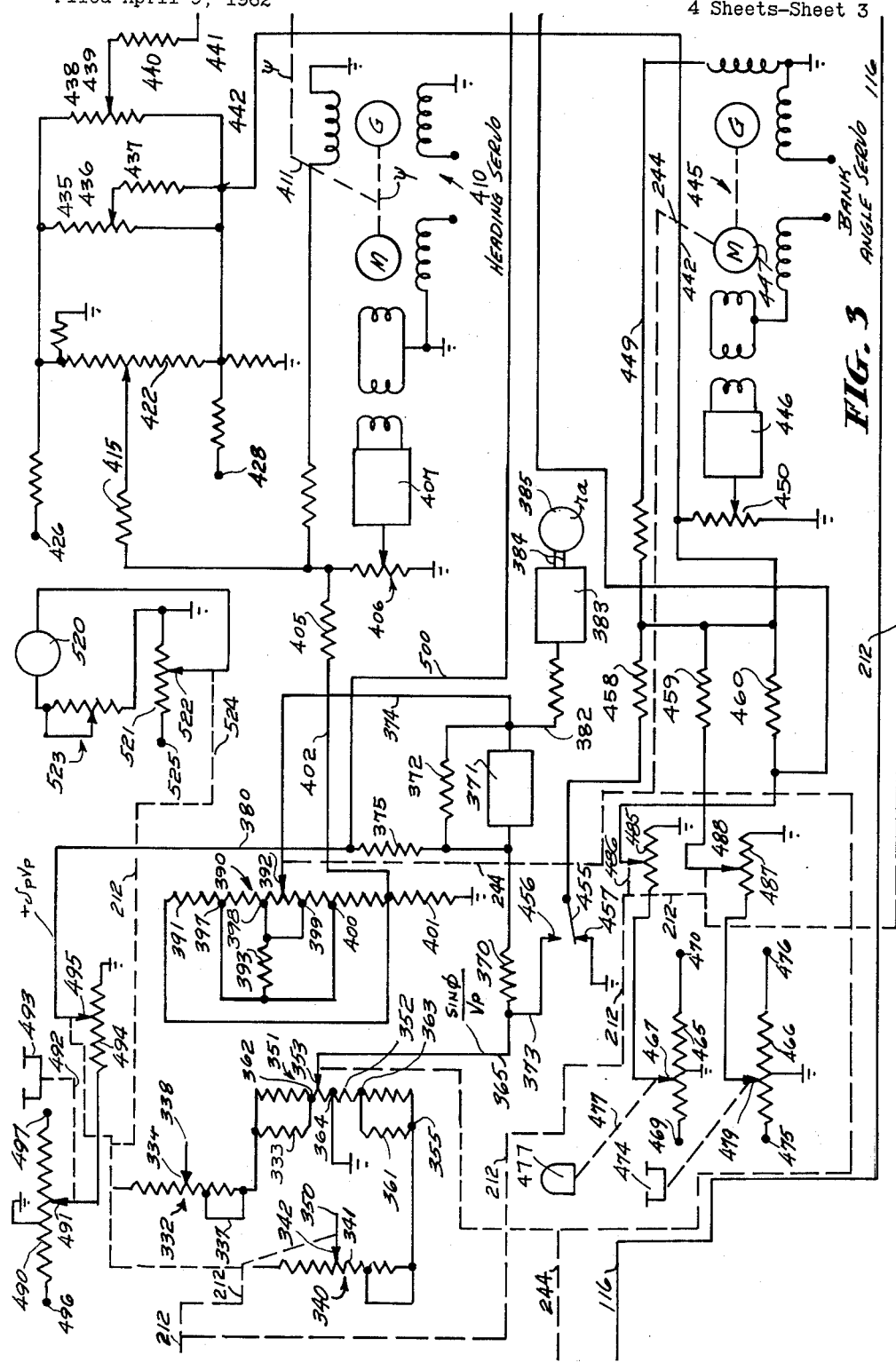

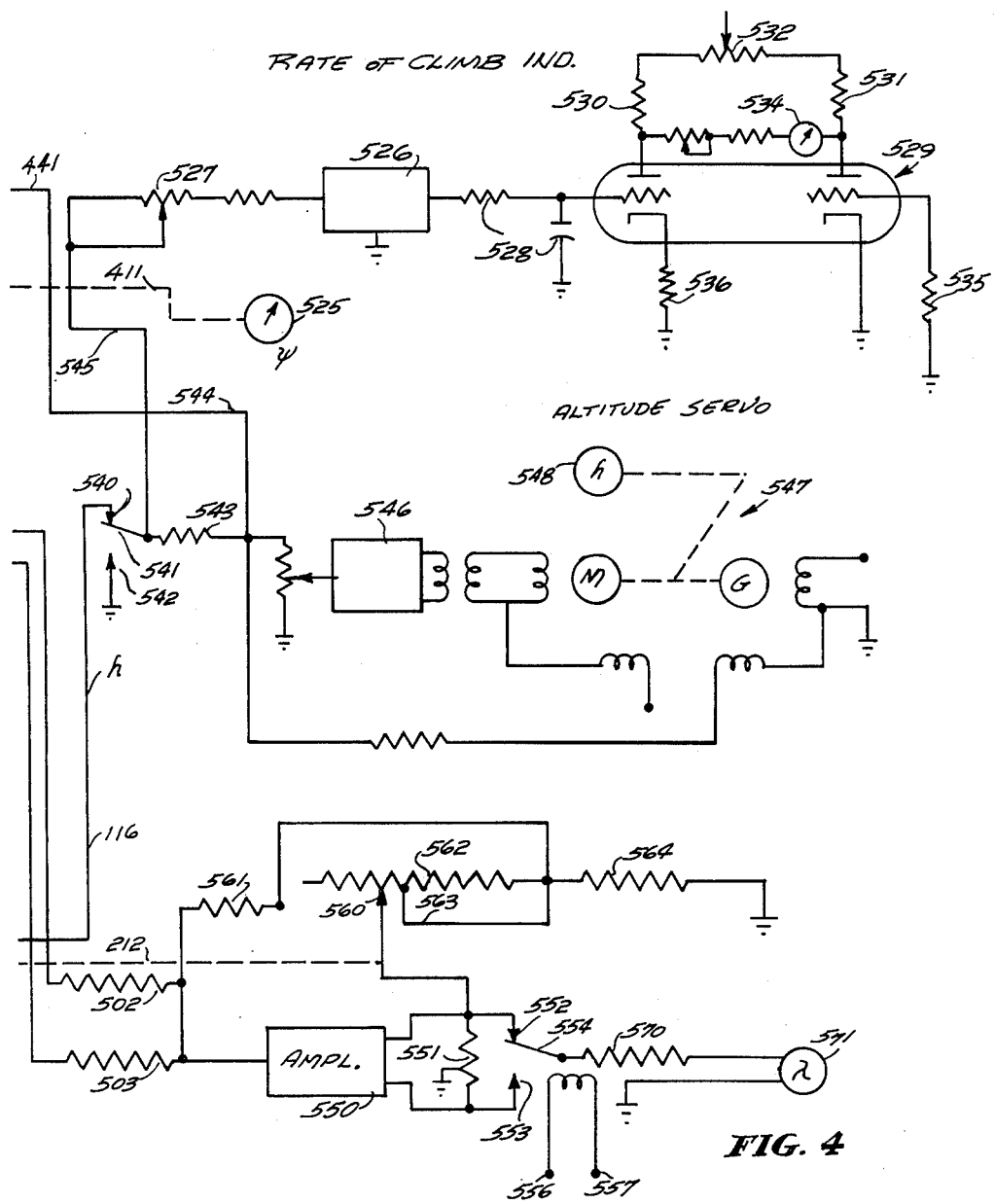
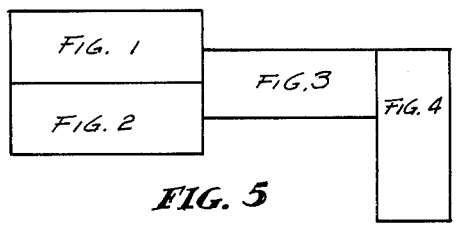

1

3,141,245
FLIGHT SIMULATOR
Carl W. Satterthwaite, Binghamton, N.Y., assignor to
Link Division of General Precision, Inc., Binghamton,
N.Y., a corporation of Delaware
Filed Apr. 9, 1962, Ser. No. 185,999
10 Claims. (Cl. 35—12)

This invention relates to grounded aircraft training apparatus in which the operation of controls similar to those of an actual aircraft cause indications upon simulated aircraft instruments observable by a student operator, whereby such student operator may be given ground training to insure efficient aircraft operation under actual flying conditions in an actual aircraft.

More particularly, this invention relates to flight computing systems and apparatus for automatically computing in the course of simulated flight maneuvers flight values, such as airspeed, direction, rate of turn, climb an ddive, altitude, etc., thereby representing desired flight conditions as indicated by the manipulation of simulated flight controls by a student.

Since modern day aircraft are costly to build, to fly, and to maintain, and the use of such aircraft for extended periods for training personnel unacquainted with a given type of aircraft is both costly and hazardous, the use of grounded trainers to give extensive preliminary training has become common. As will be apparent, the value of such preliminary training in ground aircraft trainers depends largely upon the degree of realism of the cockpit environment to which the student is subjected while he "flies" the grounded aircraft trainer. On the other hand, it will be equally apparent that this realism can be achieved only at substantial cost.

It is therefore a primary object of this invention to provide grounded flight training apparatus which simulates actual cockpit environmental conditions sufficiently realistically for effective training at sufficiently low cost to enable the wider use of grounded aircraft training apparatus than has hitherto been ecomonically feasible.

It is another object of this invention to provide improved grounded flight training apparatus in which aircraft operation is realistically simulated, consistent with cost of the apparatus, before, during, and after simulated takeoff and landing.

It is a further object of this invention to provide grounded flight training apparatus computer systems which provide correct operating potentials for actuating simulated aircraft instruments.

It is a further object of this invention to provide grounded aircraft trainer flight computing means wherein a relatively limited number of well known electronic computing means are so interconnected and arranged as to simulate flight operations with a high degree of versimilitude hitherto unachievable with a limited amount of component equipment.

Other objects of the invention will in part be obvious and will in part appear hereinafter.

The invention, acordingly, comprises the features of construction, combinations of elements, and arrangements of parts, which will be exemplified in the constructions hereinafter set forth, and the scope of the invention will be indicated in the claims.

For a fuller understanding of the nature and objects of the invention reference should be had to the following

2 detailed description taken in connection with the accompanying drawings, in which:

FIG. 3 shows in partial block form a schematic diagram of further portions of the flight computing system of my invention useful in understanding the operation of the invention;

FIG. 4 shows in partial block form a schematic diagram of portions of the flight computing system of my invention useful in understanding the operation of the invention;

FIG. 5 (on the same sheet as FIG. 4) is a diagram showing the manner in which FIGS. 1 through 4 may be assembled into a unified schematic diagram of a flight computing system according to my invention.

Figure 1:
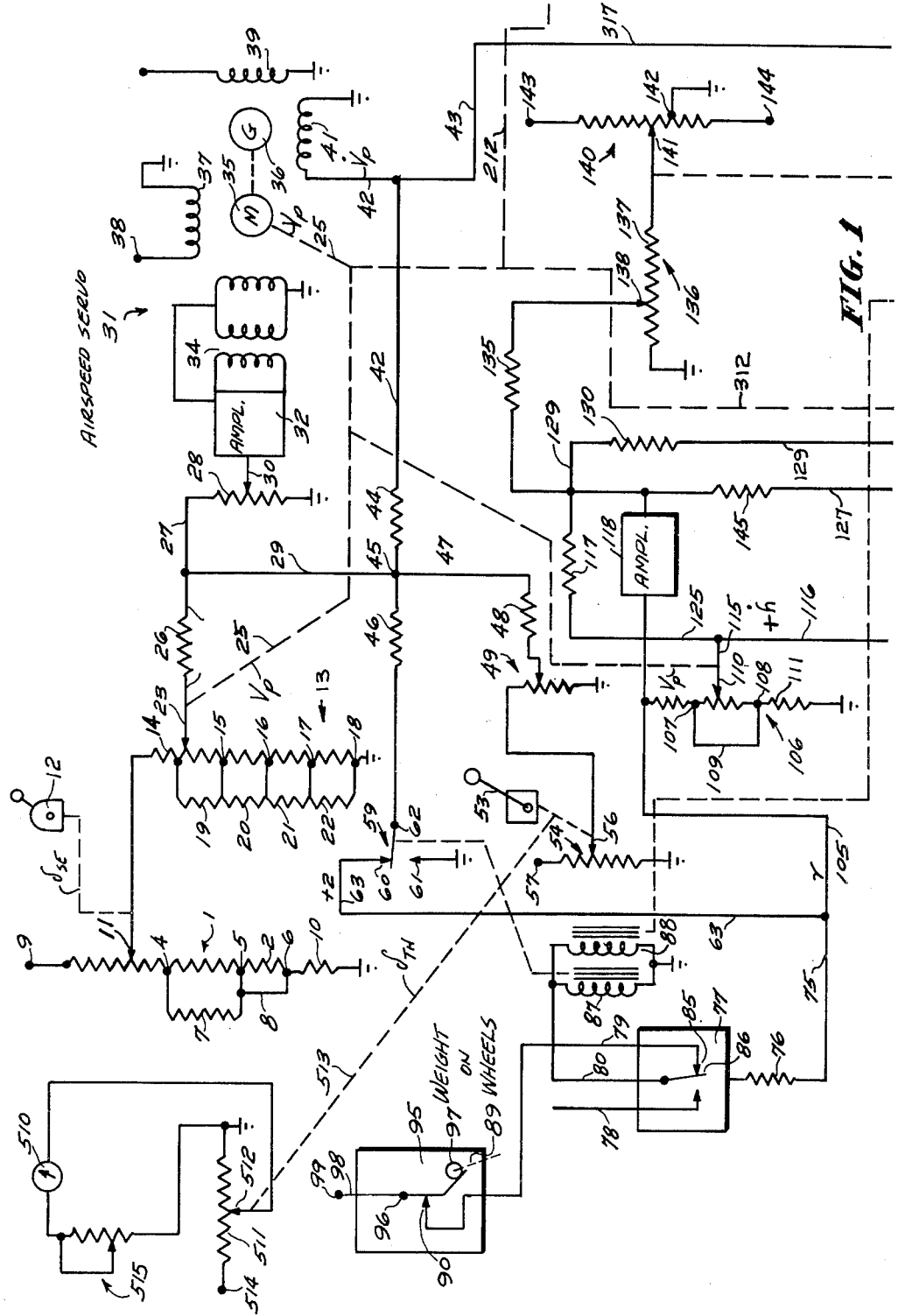
FIG. 1 shows in partial block form a schematic diagram of portions of the flight computing system of the invention useful in understanding the operation of the invention.

In the drawings certain well-known apparatus is shown in block form for sake of clarity. Generally, the elements illustrated as blocks in the drawings are discussed in detail in the wel-known tevt "Electronic Analog Computers," by Korn and Korn (McGraw Hill, New York, 1952).

Indicated symbolically and schematically in the figures are the simulated aircraft controls utilized commonly in modern grounded aircraft trainers. Since many arrangements of such controls which may be used in conjunction with the flight computing system of the instant invention are believed to be quite apparent to those skilled in the art, no detailed showing of such mechanical arrangements is deemed necessary. Such controls may comprise for example, aileron control effected by lateral movement of a "stick" or turning of a wheel, elevator control effected by longitudinal movement of a "stick" or wheel, rudder pedal movement, brake pedal movement, etc. Other simulated controls for devices commonly utilized on actual aircraft such as wing flaps and landing gear controls may be provided.

A simulated control column of particular merit which may be utilized with the present invention is shown in application Serial No. 104,059 filed April 19, 1961 by Albert J. Rider (whose assignee is common to that of the instant invention), for "Trainer Control Column Apparatus."

A simulated aircraft altitude-horizon instrument of particular merit which may be utilized with the present invention is shown in application Serial No. 87,196 filed February 6, 1961, by Joseph Ziegler (whose assignee is common to that of the instant invention), for "Simulated Aircraft Instrument."

Since motor-driven potentiometers have been widely used in simulating the operation of aircraft a detailed showing and description of such controls has been omitted in the interest of clarity.

Referring now to FIGS. 1 through 4 which together comprise a schematic diagram of a flight computing system according to the instant invention, that part of the flight computing system according to the instant invention conventionally designated the airspeed servo will first be described.

To compute the airspeed the airspeed servo solves the following equation:

$$\dot{V}_p = .0085\, T_N - [.04 + f_1(\delta_{SE})][.0016]V_p^2 + .562\gamma \quad (I)$$

$V_p$ = Airspeed
$T_N$ = thrust
$\delta_{SE}$ = fore-and-aft control column deflection
$\gamma$ = flight path elevation angle
$f_1(\delta_{SE})$ = the deflection of the simulated elevator surfaces, or $s_e$ of the simulated aircraft, is related to $\delta_{SE}$ the control stick deflection as in the following table:

| Elevator Stick Deflection $\delta_{SE}$ | Simulated Elevator Surface Deflection $f_1(\delta_{SE})$ |
| --- | --- |
| +15° | 0 |
| +2.2° | 0 |
| −2.2° | .0183 |
| −15° | .315 |

As may be seen from the schematic diagram, the second term on the right side of Equation I is computed by potentiometer 1 and servo-driven potentiometer 13. The slider 11 of potentiometer 1 is positioned by the fore-and-aft motion of simulated control stick, or column, 12. The mechanical interconnection between the simulated control stick 12 and the slider of potentiometer 1 may be of the conventional type well known in the prior art. Preferably, however, the simulated control column arrangement of particular merit which is disclosed in co-pending United States patent application Serial No. 104,059, filed April 19, 1961, by Albert J. Rider (whose assignee is common to that of the instant invention) for "Trainer Control Column Apparatus" may be used with the flight computing system of the instant invention.

As shown in FIG. 1, potentiometer 1 is tapped at points 4, 5, and 6, and resistor 7 and shunt 8 are connected across these points. As will be apparent to those skilled in the art, by proper selection of the tapping points, 4, 5, and 6, the value of resistor 7, and the value of resistor 10, potentiometer 1 may be so arranged that the output voltage produced at the slider 11 thereof will be proportional to the expression $$[.04 + f_1(\delta_{SE})]$$

in Equation I when terminal 9 is excited. Terminal 9 may, for instance, be excited with an alternating voltage of approximately 50 volts having a frequency of 60 cycles per second. Typical component values which may be used with such excitation are:

Potentiometer 1: 5,000 ohm (linear)
Tap 4 at: 137°
Tap 5 at: 183°
Tap 6 at: End of card
Resistor 7: 190 ohms
Resistor 10: 332 ohms The potential derived from potentiometer 1, as described above, is applied by means of a lead attached to slider 11 to excite potentiometer 13.

As may be seen from FIG. 1, alternating current servo 31, comprising summing amplifier 32, transformer 34, alternating current servomotor 35, and alternating current feedback generator 36, positions slider 23 of potentiometer 13 in accordance with airspeed ($V_p$) by means of mechanical connection 25. Potentiometer 13 is tapped at points 14, 15, 16, 17, and 18, and "padding" resistors 19, 20, 21, and 22 are connected between these points, the points of tapping and the resistance values of the padding resistors being selected in the well known manner so that the input voltage applied to the top of potentiometer 13 from slider 11 of potentiometer 1 is multiplied by the square of the displacement of slider 23, i.e., by $V_p^2$. The method of selecting the tapping points 15, 16, 17, and 18, and the method of selecting the values of the padding resistors 19, 20, 21, and 22, is well known to those skilled in the art and need not be repeated herein. Typically, the tapping points 14, 15, 16, 17, and 18 may be located at 255°, 182°, 119°, 55°, and 0° from the grounded end 18 of potentiometer 13, and the values of padding resistors 19, 20, 21, and 22 may be 68 ohms, 100 ohms, 20,000 ohms, 9,090 ohms, and 1,400 ohms, respectively. It will be apparent that alternative forms of squaring potentiometer may be substituted for padded potentiometer 13 as a matter of choice. For instance, wire-wound potentiometers which are given the proper "taper" (or rate of resistance change with respect to shaft displacement) by suitable changes in the shape of the card, the pitch of the winding, and/or the wire diameter in accordance with the desired squaring function may be employed. In addition, "tapered" film potentiometers may be used.

Thus, it may be seen that the voltage derived at slider 23 of potentiometer 13 will be proportional to the second, negative, term of Equation I, it being obvious to those skilled in the art that the factor (.0016) of said second term will have been inserted by properly "scaling," say, the value of potentiometer 13 and its associated padding resistors, or the value of resistor 26. This voltage, computed in the remarkably simple manner shown, is used to simulate the total drag force D occurring during simulated flight. Drag acts along the instantaneous flight path direction of the aircraft, and includes both profile drag and induced drag.

As may be seen from FIG. 1, the lift voltage derived at slider 23 of potentiometer 13 is applied to a first end of resistor 26, the other end of which is connected directly to the summing point 27 of servo summing amplifier 32, which is conventional and need not be described. Voltages representing the other terms of Equation I are also connected to summing point 27 by means of lead 29. Servo amplifier 32, as noted hereinabove, is a part of alternating current servo 31, which operates as follows. The output of the amplifier 32 is used to control an automatic balancing servo network including, for example, a two-phase motor 35, the control phase of which is energized by the servo amplifier output through transformer 34 as illustrated, and the other phase by a constant reference alternating current voltage applied to field winding 37 through terminal 38. The constant reference alternating current voltage applied to terminal 38 of field winding 37 may, in a practical embodiment, be a 60 cycle voltage 90 degrees out of phase with the voltage applied to terminal 9 of potentiometer 1. The operation of this type of alternating current two-phase servo motor is well known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The alternating current servo motor 35 drives a two-phase feedback alternating current generator 36 as shown by the dashed line therebetween in FIG. 1. One phase, or field winding 39, of alternating current feedback generator 36 is energized by an alternating current reference voltage which may, in a practical case, be of the same frequency and phase as the voltage applied to terminal 9 of potentiometer 1. The other phase, or field winding, 41 of alternating current feedback generator 36 generates, according to the speed of servomotor 35, a feedback voltage which is applied by means of leads 29 and 42 and resistor 44 to summing point 27, 45 of servo amplifier 32.

As is well known to those skilled in the art, this feedback loop enables servo system 31 to integrate the $\dot{V}_p$ signals fed to the input resistor 28 of summing amplifier 32. If the motor 35 alone were relied upon to perform the $\dot{V}_p$ integrating operation, then the friction drag and inertia of the mechanical components of the servo system would introduce such a large error that from a practical standpoint the system would not be useful, i.e., the system would not integrate with sufficient accuracy to solve Equation I with sufficient accuracy to provide sufficiently realistic simulation. However, with feedback generator 36 connected in the system as shown, the feedback voltage constitutes an input for amplifier 32 which is of such phase relation to the summed or resultant input signal that it opposes the same, i.e., in the manner of degenerative or negative feedback. With large gain in the servo amplifier 32, the speed of motor 35, according to well known principles, is therefore caused to have a linear response to the magnitude of the input signal, i.e., $\dot{V}_p$, without lag or overshooting, thereby integrating both high and low airspeeds with high precision. It will be apparent that when the main input signal is reversed so as to operate motor 35 and generator 36 in the opposite direction, the phase of the feedback voltage will likewise be reversed so as to oppose the input signal as before, and bring about dead beat motor response and, thus, accurate integration.

Thus, since output shaft 25 of motor 36 is rotated accurately in proportion to the integral of $V_p$, it may be seen that slider 23 of potentiometer 13 will be at all times acurately positioned according to $V_p$, and that the signal supplied through resistor 26 to summing point 27 will be accurately proportioned to the second, negative, term of Equation I.

The third term on the right side of Equation I is supplied in the form of an electrical signal to summing point 45, 27 through resistor 46 and relay 59. The production of this signal, which represents the effect of weight acceleration of the aircraft along its flight path, and which is supplied to relay 59 over line 63, will be explained hereinafter.

Relay 59, which is operated by coil 87, normally has its moving contact 62 operated to upper contact 60. In this position, relay 59 passes electrical signals proportional to the third term of Equation I from lead 63. When, however, as will be explained hereinafter, boil 87 is energized by potentials produced by the simulated altitude of the simulated aircraft reaching zero, moving contact 62 of relay 59 is drawn to grounded contact 61. By this means, it is assured that the voltage representing the third term of Equation I will always go to zero when the simulated aircraft is landed. The operation of the circuit for energizing relay coil 87 will be explained hereinafter.

The signal proportional to the first term on the right side of Equation I, which represents the component of thrust acting along the aircraft flight path is produced on line 47 to summing point 45 by potentiometer 54 which is energized at terminal 57, typically, by a negative potential of approximately 50 volts, 60 cycles, and the slider 56 of which is operated by simulated throttle 53. In addition to summing resistor 48, it is convenient to employ in this thrust branch circuit an additional potentiometer 49 which may be conveniently adjusted to properly "scale" the signal produced by potentiometer 54 to the other signals supplied to summing point 45.

Air speed servo 31, then, supplies an output in the form of the rotary position of shaft 25, which shaft position is proportional to airspeed, $V_p$. The tachometer generator winding 41 driven by airspeed servo 31 also supplies an output in the form of a voltage proportional to the derivative of the airspeed with respect to time, $\dot{V}_p$. This voltage is fed by means of lead 43 to other computing circuitry which will be described hereinafter.

The instruments of the simulated aircraft are caused to manifest the effect of contact with ground when landing by the circuit connected to lead 75 of FIG. 1. In this circuit the numeral 77 designates a phase detector which may, for instance, comprise a well known phase-sensitive rectifier of the type discussed at pages 312 through 316 of Principles of Radar, by Reintjes and Coate of the Massachusetts Institute of Technology, 3rd Edition, 1952 and a relay operated thereby. Such a phase-detector is also described in detail in Appl. Ser. No. 384,276 (PJ-001) filed October 5, 1953 by John M. Hunt, now abandoned. The direct voltage-variable polarity output of the phase-sensitive rectifier will then be used to actuate the relay, the parts of which are designated 78, 79, 80, 85, and 86 in FIG. 1. It will be noted that lead 78 to the left hand fixed contact of this relay is indicated merely for purposes of complete illustration of a practical embodiment of the invention, and is not employed in the instant circuit. Fixed contact 85 of the phase detector relay, as shown in the figure, is connected by means of line 79 to further element 95 which will be explained hereinafter, the further element being employed to connect or disconnect fixed contact 85 to or from supply point 99, at which, typically, 100 volt, 60 cycle, alternating current voltage is applied to operate relay coils 87 and 88 upon actuation of the relay contained in phase detector 77. In the operation of phase detector 77 a signal proportional to flight elevation angle $\gamma$ is supplied over lines 75 and 105 through resistor 76 to what would be designated the error voltage terminals in other applications of phase-sensitive rectifier circuits. Though not shown, for reasons of clearness, the phase detector circuit 77 will, of course, be supplied with a reference A.C. voltage. The phase detector circuit 77 is so constructed and arranged that contacts 85 and 86 will be closed when the $\gamma$ signal supplied through resistor 76 is of such phase as to indicate that the flight path elevation angle of the simulated aircraft is at that time negative, i.e., that the aircraft is descending. Conversely, the phase detector circuit 77 is so constructed and arranged that contacts 85 and 86 will be open when the phase of the $\gamma$ signal supplied through resistor 76 indicates that the path elevation angle of the simulated aircraft is positive and the aircraft is climbing. Thus, it may be seen that circuit 77 operates to connect the potential on lead 79 through to relay coils 87 and 88, and thus to ground, when the $\gamma$ of the simulated aircraft is negative, and not when the $\gamma$ of the simulated aircraft is positive.

Block 95 of FIG. 1 indicates an auxiliary portion of the altitude servo, described hereinbelow, in which cam 97 is rotated by the output shaft 89 of the altitude servo motor to selectively open and close fixed contact 90 and moving contact 96 in accordance with simulated altitude. Moving contact 96 is connected with supply terminal 99, described hereinabove, by means of line 98. In the operation of circuit 95, contacts 90 and 96 will be open when the simulated altitude as indicated by the angular position of shaft 89 is greater than zero.

Thus, reviewing the operation of circuits 77 and 95 as they affect the operation of relay 59 by energizing, or not energizing, relay coil 87, it may be seen that these circuits serve to energize coil 87, and swing contact 62 to ground contact 61, when, and only when, the altitude of the simulated aircraft is zero and the $\gamma$ of the simulated aircraft is simultaneously negative.

While it will be obvious to those skilled in the art that a large number of considerably more sophisticated circuit arrangements may be employed in order to simulate ground contact effects with a higher degree of versimilitude, the circuits of the instant invention are particularly adapted to simulate ground contact in landing a simulated aircraft with a sufficiently high degree of versimilitude for authentic and meaningful training, consistent with the production of training devices which are economically feasible for wide use.

Figure 2:
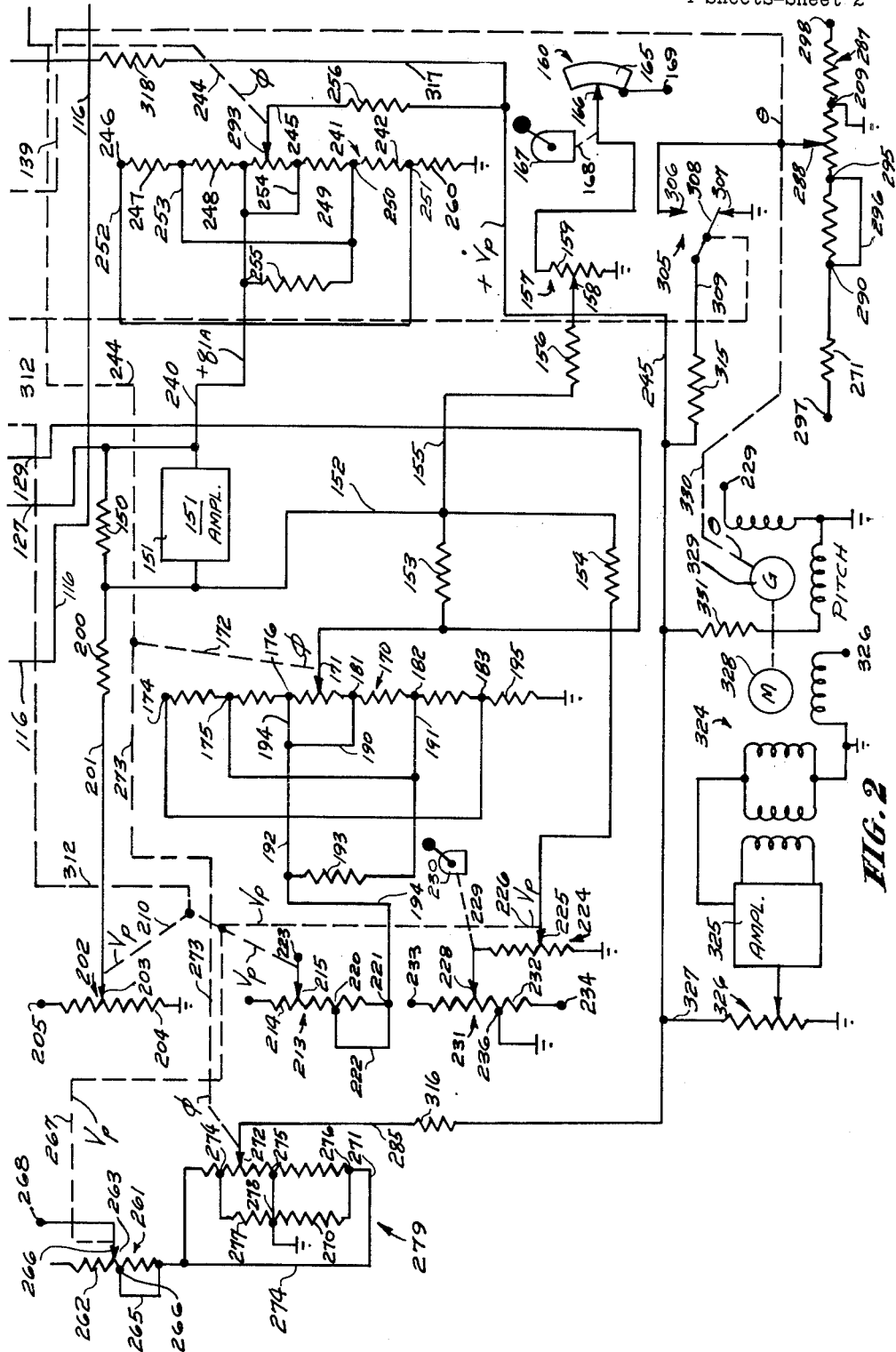
FIG. 2 shows in partial block form a schematic diagram of further portions of the flight computing system of my invention useful in understanding the operation of the invention.

The $\gamma$ signal which is supplied over line 105 to the airspeed servo and to the landing force, or weight on wheels, circuits 77, 95 is supplied by the summing amplifier 118 and its associated circuitry as shown in FIGS. 1 and 2.

To compute the flight path elevation angle $\gamma$ this circuit continuously solves the following equation:

$$\gamma = \theta - \frac{[1.89 \times 10^5]\cos\phi}{V_p^2} - \frac{102\, q_{1A}}{V_p} \quad \text{(II)}$$

where $\gamma$ = flight path elevation angle
$\theta$ = pitch angle
$\phi$ = bank angle
$V_p$ = airspeed
$q_{1A}$ = pitching rate about the aircraft structural $y$—$y$ or wing-to-wing axis.

The summing point of amplifier 118 is supplied with three simulated aircraft condition indicating signals through three resistors 135, 130, and 145. The signal fed to summing amplifier 118 through resistor 135 is proportional to $\theta V_p$, and is derived from sub-circuits 136 and 140 in a manner which will be explained hereinafter. The signal which is fed to the summing point of amplifier 118 through resistor 130 is proportional to $$\frac{\cos\phi}{V_p}$$

and is derived from servo driven potentiometer 170 in a manner to be described hereinafter. The signal which is fed to the summing point of summing amplifier 118 through resistor 145 is proportional to $q_{1A}$, and is produced by a circuit including summing amplifier 151 and servo-driven potentiometer 202 in a manner to be described hereinafter.

Resistor 117 and servo-driven potentiometer 106, which is grounded through resistor 111, provide a feedback path from output line 105 of summing amplifier 118. As shown in FIG. 1, the slider of potentiometer 106 is positioned by mechanical intercoupling means such as a gearbox connected to the output shaft 25 of airspeed servo motor 35. Thus, the slider 110 of potentiometer 106 is positioned in accordance with airspeed $V_p$. Feedback amplifier 118 is provided with high gain and operates to provide an output potential $E_0$ of the proper magnitude and phase to reduce the input signal at its summing junction to zero. Setting the input potentials to amplifier 118 equal to zero:

$$\theta V_p - \frac{g\cos\phi}{V_p} - q_{1A} - E_0 V_p = 0$$

$$E_0 V_p = \theta V_p - \frac{g\cos\phi}{V_p} - q_{1A}$$

$$E_0 = \theta - \frac{g\cos\phi}{V_p^2} - \frac{k q_{1A}}{V_p}$$

where $g$ and $k$ are constant scale factors, $g$ representing gravitational acceleration. Now it will be appreciated by those skilled in the art that the electrical signal $E_0$ produced by summing amplifier 118 and its associated feedback network on line 105 will comprise the sum of the terms supplied to the summing point of amplifier 118 through resistors 135, 130 and 145, all divided by a quantity proportional to the angular position of slider 110 of potentiometer 106. Thus, it may be seen that amplifier 118 and its associated network correctly solves Equation II above, since Equation II may be derived by adding the terms which are stated above as being supplied through resistors 135, 130, and 145, and dividing this whole by $V_p$, which is accomplished by the positioning of slider 110 of potentiometer 106 in accordance with the position output of airspeed servo motor 35 which is proportional to $V_p$. The mathematical constants of Equation II, such as 102 in the third term of that equation will, of course, be inserted in the well known manner by, for instance, the proper selection of values of resistors 135, 130 and 145.

As may be noted from FIG. 1, resistor 106 is tapped at points 107 and 108 and a shunt 109 placed thereacross. In addition, series resistor 111 is interconnected between the lower end 108 of potentiometer 106 and ground. The position of tapping points 107 and 108, and the value of resistor 111, may be selected by those skilled in the art in such manner as to insure that the signal fed back to the input of amplifier 118 through resistor 117 does not go below a preselected value. Thus, it is insured that the feedback signal does not go to sufficiently low values to drive the system to open loop condition and to produce unstable operation.

The signal proportional to $\theta V_p$, which is supplied to the summing point of amplifier 118 through resistor 135 is produced in the circuit shown in FIG. 1, which comprises servo-driven potentiometer 136 and servo-driven potentiometer 140 in the following manner. Slider 141 of potentiometer 140 is positioned by mechanical coupling means 139 in accordance with the position of servo 324, which will be described hereinafter. For the purpose of this discussion it is sufficient to note that coupling means 139 will at all times position slider 141 in accordance with pitch angle $\theta$. Center tap 142 of potentiometer 140 is grounded as shown in the figure. Terminal 143 of potentiometer 140 may, for instance, be supplied with reference 60 cycle A.C. voltage of approximately 50 volts while terminal 144 thereof may, for instance, be supplied with 60 cycle A.C. voltage of 50 volts having instantaneous polarity opposite to that of the voltage supplied to terminal 143. It will be apparent to those skilled in the art that, while the magnitude of the voltage supplied to terminals 143 and 144 may be varied, though equal, the opposite instantaneous polarity relationship of the alternating voltages supplied to the two terminals must be maintained. Potentiometer 136, comprising a resistance element 137 and slider 138 may, in a practical embodiment, have a total resistance between its outside terminals of approximately 50,000 ohms, and may be connected between the slider of potentiometer 140 and ground as shown in the figure. Slider 138 of potentiometer 136 is driven by means of mechanical coupling 25 from servo motor 35 of the airspeed servo in such manner that its position along element 137 is at all times proportional to $V_p$, airspeed, as shown in FIG. 1. As will be apparent to those skilled in the art, the positioning of slider 141 at all times in proportion to pitch angle $\theta$, and the excitation of the terminals 143 and 144 of potentiometer 140 by the plus and minus, i.e., opposite phase, reference potentials, will result in a signal being produced at slider 141 which is proportional to $\theta$ and which has instantaneous polarity determined by the instantaneous positive or negative sign of $\theta$. Further, since the slider 138 of potentiometer 136 is driven in proportion to $V_p$, and since potentiometer 136 is energized by the potential supplied at slider 141, it will be apparent to those skilled in the art that the output potential at slider 138 will be proportional to the product of $\theta$ and $V_p$. That is, the output from slider 138 will be proportional to $\theta V_p$, as stated hereinabove in describing amplifier 118 and its associated circuitry.

The rate of pitch quantity $q_{1A}$ is supplied to the summing point of amplifier 118 via lead 127 from amplifier 151 and its associated rate of pitch computing network.

The quantity $q_{1A}$, the rate of pitch with respect to the aircraft $y$—$y$ frame of reference, is computed according to the following formula.

$$q_{1A} = .0245 V_p - \frac{1540\cos\phi}{V_p} - .011\delta_{SE} V_p \quad \text{(III)}$$

where $V_p$ = airspeed
$\phi$ = bank angle
$\delta_{SE}$ = fore-and-aft stick, or control column displacement.

The signal proportional to the second term on the right side of Equation III is supplied to the summing point of amplifier 151 by means of "padded" potentiometer 170 and its associated supply network 213. As may be seen from FIG. 2, potentiometer 170 is tapped at points 174, 175, 176, 181, 182, and 183, and the shunts 190, 191, and 192, and padding resistor 193 connected across the indicated pairs thereof. It will be apparent to those having skill in the art that the locations of the tapping points on potentiometer 170, and the value of resistor 193, may be so selected as to cause the input voltage to this network applied to lead 194 to be at all times multiplied by the cosine of an angle proportional to the angular displacement of slider 171. Since slider 171 is at all times angularly positioned in proportion to bank angle $\phi$ by mechanical interconnection 172, 244, as will be described hereinafter, it may be seen that the output from slider 171 of potentiometer 170 will be at all times proportional to the input on line 194 multiplied by the cosine of $\phi$. Though not intended to be limiting, a typical arrangement of the padded cosine potentiometer which might be used in an embodiment of the instant invention might comprise a standard 320° linear potentiometer tapped at zero degrees, 80°, 142° 178°, 240° and 320°, and having shunts connected across the zero and 320° taps, across the 80° and 240° taps, and across the 142° and 178° taps, and a 1,370 ohm resistor connected across the 80° and 178° points, and the input line 194 connected to the 178° point. The purpose of level-setting resistor 195 will be apparent to those skilled in the art and, though the computation of its value is non-inventive and not limiting here, it is noted that a typical value might be, for instance, approximately 700 ohms.

As shown in FIG. 2, the input signal to padded cosine potentiometer 170 on input line 194 is supplied from servo-driven potentiometer 213. Servo-driven potentiometer 213 may, in an exemplary but not limiting embodiment, be a linear potentiometer in which resistance element 214 has a total resistance value of 20,000 ohms. Mechanical interconnecting means 210 displaces slider 215 of potentiometer 213 by amounts directly proportional to airspeed, mechanical interconnection 210 being driven by motor 35 of the airspeed servo as described hereinabove. The slider terminal 223 of potentiometer 213, may, in a particular embodiment, for instance, be excited from a 60 cycle A.C. voltage source having a value of approximately 50 volts, and having the same instantaneous polarity as that of the A.C. voltage applied to terminal 144 of potentiometer 140. The lower terminal 221 of this potentiometer is connected to input line 194 of padded cosine potentiometer 170, and supplies the exciting potential to potentiometer 170. As will be apparent to those skilled in the art, the output at lower terminal 221 will be an alternating current, the amplitude of which will be inversely proportional to airspeed $V_p$. If desired, potentiometer 213 may be equipped at its lower end with a shunt 222 connected across points 220 and 221 as shown in the figure. The purpose and function of this shunt is identical to that of shunt 109 described above in connection with potentiometer 106 and need not be described again at this point. Thus, it may be seen that, by the coaction of potentiometer 213 and potentiometer 170, and their associated circuitry, a signal is fed through scaling resistor 153 and line 152 to the summing point of summing amplifier 151 which is proportional to the second term in Equation III, the constant 1540 in said second term being provided for by scaling the elements of this network in the manner well known to those skilled in the art.

The signal proportional to the first term of Equation III is supplied to the summing point of amplifier 151 through summing resistor 200 by means of servo-driven potentiometer 202. The slider 203 of servo-driven potentiometer 202 is positioned in proportion to airspeed $V_p$, by means of mechanical connection 210, 312, which itself is driven by servomotor 35 of the airspeed servo as described hereinabove. Terminal 205 of potentiometer 202 may, in a practical embodiment, be supplied with 60 cycle alternating current of opposite instantaneous polarity to that of the reference 60 cycle supply used to excite terminal 9 in FIG. 1. Thus, the output on line 201 will be proportional to airspeed, $V_p$, multiplied by a constant. This constant may be selected as .0245, i.e., the constant in the first term of Equation III, by proper selection of the overall resistance value of card 204 of potentiometer 202 and the value of summing resistor 200 in a manner well known to those skilled in the art. In a practical embodiment the total resistance value of card 204 may be 10,000 ohms, and the value of resistor 200 may be 5,620,000 ohms. In such a practical embodiment the value of feedback resistor 150 may be 1 megohm.

The signal proportional to the third term of Equation III is supplied to the summing point of amplifier 151 through summing resistor 154 by means of servo-driven potentiometer 224 and potentiometer 231. The slider 225 of servo-driven potentiometer 224 is positioned by means of mechanical connection 226 in accordance with airspeed, $V_p$. As shown in FIG. 2, the lower terminal of potentiometer 224 is grounded, while the upper terminal of potentiometer 224 is directly connected to slider 228 of potentiometer 231. Thus, the output of potentiometer 224 will be a signal proportional to the product of $V_p$ and the signal supplied by potentiometer 231 through the connection to slider 228.

The slider 228 of potentiometer 231 is positioned through mechanical linkage 229 which is driven by simulated control stick, or control column, 230. It should be noted at this point that the simulated control stick, or control column of the simulated aircraft, and similar mechanical controls, are indicated herein at several points in the drawing by symbols located contiguous to the member to be impelled thereby, the several symbols having different reference numbers but being referred to by the same term in the specification. This convention has, of course, been adopted in order to clarify the text of this specification and the drawings, and to avoid the confusion of additional large numbers of indicated mechanical interconnections which would have to be shown as dashed lines on the drawings were not this convention adopted. Thus, for instance, the single control column, or stick, of the simulated aircraft is indicated in FIG. 1 by the numeral 12 and in FIG. 2 by the numeral 230.

The upper terminal 233 of potentiometer 231 may, in a practical embodiment, be energized with 60 cycle alternating potential of approximately 50 volts magnitude having the same instantaneous potential as the reference 60 cycle supply of the simulator (viz., the supply which excites terminal 9 in FIG. 1). The lower terminal 234 of potentiometer 231, on the other hand, may, in a preferred embodiment, be energized by a 60 cycle alternating potential of approximately 50 volts magnitude which has the opposite instantaneous polarity to that of the 60 cycle reference voltage source of the simulator. Center tap 236 of potentiometer 231 is grounded. In a preferred embodiment the total resistance value of card 232 may be 5,000 ohms while the card of potentiometer 224 may have a total value of 50,000 ohms. Thus, it may be seen that the network comprising servo-driven potentiometer 224 and potentiometer 231 supply to summing resistor 154 a signal proportional to the product of fore-and-aft control column deflection, $\delta_{SE}$, and airspeed, $V_p$. When the value of summing resistor 154 is properly selected (e.g., 825,000 ohms in the preferred embodiment given above) this product will in turn be effectively multiplied by the constant .011, and the summing point of amplifier 151 will be fed with a signal proportional to the third term of Equation III.

Adverting now to summing amplifier 151, it may be seen that the output of this amplifier on lead 240 is proportional to the pitching rate $q_{1A}$, since this amplifier sums the three terms of Equation III which are supplied to its summing point by the sub-circuits described hereinabove.

Returning now to amplifier 118 and its associated components, it will be seen that the $q_{1A}$ signal produced at the output of amplifier 151 is supplied through summing resistor 145 to the summing point of amplifier 118. An additional term is supplied to the summing point of amplifier 118 over lead 129 through summing resistor 130 from the output of padded cosine function generating servo-driven resistor 170, the operation of which has already been described hereinabove.

It will be evident from the above that the output of amplifier 118 and its associated feed network, which appears on lead 105, is proportional to $\gamma$, the flight path elevation angle, since the terms shown hereinabove to be supplied through each one of the summing resistors, 135, 130, and 145 when divided by airspeed $V_p$ (which division is accomplished by potentiometer 106) are the three terms of Equation II.

As is well known to those skilled in the art, provisions for simulating normal stall must be provided in even rudimentary flight simulators in order to assure accurate training. In a preferred embodiment of the instant invention it is found convenient to provide for the simulation of normal stall by adding an additional term to the machine equtaion solved by summing amplifier 151 and its associated subcircuits, viz., Equation III. This term, which is a constant in the preferred embodiment, is supplied as an electrical signal to summing point 152 of amplifier 151 over line 155 as shown in FIG. 2. Control column, or stick, 167 positions slider 166 of potentiometer switch 160 by means of mechanical interconnection 168. Terminal 169 of shorting bar 165 of potentiometer switch 160 is excited from an alternating voltage supply which may, in the preferred embodiment, have a magnitude of approximately 50 volts at 60 cycles, and the same instantaneous polarity as that of the voltage exciting terminal 9. The output from slider 166 is applied across adjusting potentiometer 157, the other end of which is connected to ground. Shorting bar 165 covers only a short segment of the card of potentiometer switch 160, the remainder thereof being insulated in the preferred embodiment. Mechanical interconnection 168 is so constructed and arranged that slider 166 contacts shorting bar 165 only when stick 167 is operated into such a position by the trainee as would result in stalling the actual aircraft in actual flight. The proportioning of shorting bar 165 and the mechanical arrangement of interconnection 168 to produce this result will be apparent to those skilled in the art when it is desired to simulate any particular aircraft, the flight characteristics of which are known.

The pitch servo 324, as shown in FIG. 2, continuously solves the equation $$\dot{\theta} = q_{1A} \cos \phi - \frac{1845}{V_p} \sin^2 \phi + .13 \dot{V}_p \qquad (IV)$$

where $\theta$ = pitch
$q_{1A}$ = rate of pitch
$\phi$ = bank angle
$V_p$ = airspeed The necessary electrical signal corresponding to the first term of this equation is supplied by "padded" cosine-function potentiometer 241 as shown in FIG. 2. As may be seen from FIG. 2, slider 293 of potentiometer 241 is positioned in accordance with bank angle $\phi$ by mechanical connection 244 which is in turn driven by motor 447 of bank angle servo 445 of FIG. 3, which will be described hereinafter. Servo-driven potentiometer 241 is excited by the $q_{1A}$ signal supplied over line 240 from amplifier 151 in the manner described hereinabove. While alternative types of cosine-function potentiometers which will serve the purpose of potentiometer 241 will readily occur to those skilled in the art, the particular arrangement shown in FIG. 2 is well adapted to the practice of the instant invention. The selection of tapping points 246, 247, 248, 249, 250, and 251, and the value of resistor 255 and 260, will be evident to those skilled in the art and need not be taught here. In a preferred, but not limiting, embodiment of the instant invention function generating potentiometer 241 may comprise a standard tapped linear 320° potentiometer the card 242 of which has a total resistance value of 20,000 ohms. Shunt 252 will be connected across opposite ends of card 242, while shunt 253 will be connected across the 80° and 240° points of card 242. Shunt 254 will be connected across the 142° and 178° points of card 242. In this embodiment, resistance 255 will have a value of 1,370 ohms, while resistance 260 will have a value of 698 ohms. According to the well known principles of operation of servo-driven potentiometers, a signal proportional to the product of $q_{1A}$ and cosine $\phi$ will appear on line 245, and be supplied to the summing point of pitch servo summing amplifier 325 through summing resistor 256.

The second term of Equation IV is supplied to summing point 327 of pitch servo amplifier 325 by servo-driven potentiometers 261 and 279, as shown in FIG. 2. The slider 263 of potentiometer 261 is positioned in accordance with airspeed, $V_p$, by mechanical interconnection means 267, 312, 25 as shown in FIGS. 1 and 2. The slider 272 of potentiometer 279 is positioned in accordance with bank angle, $\phi$ by means of mechanical interconnections 273, 244 which are in turn driven by servo motor 447 of bank angle servo 445 as shown in FIG. 3. Terminal 268 of slider 263 of potentiometer 261 is fed with a reference alternating supply voltage which may, in a preferred embodiment, have a frequency of approximately 60 cycles per second and an amplitude of approximately 50 volts, the instantaneous polarity of this reference supply voltage being the same as that of the reference supply voltage supplied to terminal 57 in FIG. 1. Card 262 in potentiometer 261 may, in a preferred embodiment, be linear and have an overall resistance of 20,000 ohms. In such preferred embodiment, shunt 265 will be connected across the lower end of card 262 and a point 266 on card 262 in such manner as to shunt a portion of card 262 the resistance of which is equal to the equivalent resistance between said lower terminal and ground of the network comprising potentiometer 279 and its associated "padding" network as shown in FIG. 2. Since slider 263 of potentiometer 261 is driven in proportion to airspeed, $V_p$, and since shunt 265 shunts that portion of card 262 equivalent in resistance to "padded" potentiometer 279, it will be evident to those skilled in the art that the output of potentiometer 261, which is applied to terminal 274 of "padded" potentiometer 279, will be an inverse function of airspeed. Servo-driven potentiometer 279, and its associated "padding" network is constructed and arranged, by the proper selection of resistance values and tapping points, to effect an approximate multiplication of the exciting voltage at terminal 274 by the sine-squared function of the displacement of its slider 272, which, as noted above, is driven in accordance with bank angle $\phi$. The selection of said resistances and tapping points may be accomplished in a manner which will be evident to those skilled in the art, and need not be outlined at length herein. In a preferred embodiment, the card of potentiometer 279 may be linear and may have an overall resistance value of 20,000 ohms. In this embodiment tap 275 will be located at the mid-point of the card, tap 274 will be located at 120° of the card, and tap 276 will be located at 200° of the card. Resistor 277, connected between tapping point 274 and ground, may have a value of approximately 270 ohms, while corresponding resistor 270 may have approximately the same value. As shown in FIG. 2, shunt 278 will be connected between tapping point 275 and ground. Thus, as will be evident to those skilled in the art, the signal produced at slider 272 of potentiometer 279 will be directly proportional to $\sin^2 \phi$ and inversely proportional to $\dot{V}_p$; the "scaling" term, $-1845$, being produced by the proper selection of the values of servo-driven potentiometers 261 and 279, and their associated networks, and the value of summing resistance 316 in line 285. This signal, as shown in FIG. 2, is supplied to summing point 327 of servo-amplifier 325 by means of lead 285.

The third term of Equation IV is supplied to summing point 327 of servo-amplifier 325 through connections 245 and 317, including summing resistor 318, as shown in FIGS. 1 and 2. As has been described hereinabove, field 41 of generator 36 of airspeed servo 31 produces a voltage proportional to $\dot{V}_p$. The multiplying term, .13, is inserted by scaling resistor 318, the value of which may be selected by those skilled in the art without the exercise of invention. In a preferred form of the invention scaling resistor 318 may have a value of approximately 3 megohms.

In addition to the express terms of Equation IV, as set out hereinabove, an additional signal is supplied to summing point 327 of servo-amplifier 325 through resistor 315. Lead 309, which is attached to the end of resistor 315 remote from summing point 327 as shown in FIG. 2, is connected to the movable contact 308 of the relay indicated at 305 in FIG. 2, the driving coil of which is shown at 83 in FIG. 1. As described hereinabove, circuits 77 and 95 of FIG. 1 coact to energize coil 86, and will thereby swing contact 308 from ground contact 307 to upper contact 306, when, and only when, the altitude of the simulated aircraft is zero and the γ of the simulated aircraft is negative. Thus, it will be apparent that moving relay contact 308 will remain grounded through contact 307 except when the simulated controls of the simulated aircraft have been so manipulated as to land the simulated aircraft, at which time moving contact 308 will be operated upward to fixed contact 306 and the servo-driven "forcing" potentiometer 287, thus, connected to summing point 327 of servo-amplifier 325 through summing resistor 315 and line 309. Slider 288 of servo-driven potentiometer 287, is positioned by means of mechanical interconnection 330 in accordance with θ. Mechanical interconnection 330 is itself driven by servo-motor 328 of pitch servo 324, as shown in FIG. 2. As shown in the FIG. 2 shunt 296 is connected between points 290 and 295 of the card of potentiometer 287, on the +θ side of ground 209. An additional resistor 271 is connected between the left terminal 290 of the card of potentiometer 287 and supply terminal 297. Servo driven potentiometer 288 supplies a "forcing" term to summing point 327 as described hereinabove whenever the simulated aircraft is in a landed condition. As will be apparent to those skilled in the art, the magnitude of this "forcing" term corresponding to each given value of θ will be empirical in nature, depending upon the structure and handling characteristics of the aircraft being simulated. Thus, the selection of ground tapping point 209, the potential supplied at terminals 297 and 298, the magnitude of resistor 271, and the tapping points 290 and 295 for shunt 296 will be made according to well known principles by those skilled in the art, which principles need not be repeated here. In a preferred embodiment of the invention, but not a limiting embodiment thereof, the card of potentiometer 287 may be linear and have a total resistance of 20,000 ohms. In this embodiment, mechanical interconnection means 330 may be selected such that slider 288 will be positioned at the center of the card of potentiometer 287 when θ is equal to zero degrees, tap 209 being located thereat, and such that the left and right ends of card 287 correspond to θ values of plus 30 degrees and minus 30 degrees respectively. Shunt 296 will then be connected between the θ=+5° point on the left side of potentiometer 287 and the left hand (+30°) terminal of potentiometer 287. Resistor 271 will have a value of 300,000 ohms, and terminals 297 and 298 will be excited with 60 cycle alternating voltage having a magnitude of approximately 50 volts, the instantaneous polarity of the voltage applied to terminal 297 being the same as that of the voltage applied to terminal 268 and the instantaneous polarity of the voltage applied to terminal 298 being opposite to that applied to terminal 268. As will be evident from the above, servo-driven potentiometer 287 supplies, when weight-on-wheels relay 305 is operated away from ground, a "forcing" signal to summing point 327 of servo-amplifier 325 which is so phased with respect to the θ inputs supplied by the other signal means connected to terminal 327 as to drive pitch servo 324 to zero pitch indication when the simulated aircraft is landed.

Pitch servo 324, then, operates to solve Equation IV continuously, except when the simulated aircraft is in landed condition, at which time the servo-driven potentiometer 287 drives servo-motor 328 and servo-generator 329 to zero output, i.e., to θ=0 indication. The operation of servo-integrating system 324 being well known in the art, and having been described hereinabove in connection with other servos, need not be set forth here. Nor should it be necessary to point out that resistor 331 constitutes the feedback summing resistor, and is connected between the output terminal of the feedback winding of generator 329 and summing point 327 of amplifier 325. It will also be evident to those skilled in the art that terminals 229 and 336 may be excited with the same reference supply potentials which are applied to windings 39 and 37, respectively, of the generator and motor of airspeed servo 31.

The quantity $r_a$, rate of turn, is computed according to the following equation.

$$r_a = .0916\,[-.031\delta_p]V_p + \frac{1845}{V_p}\sin\phi \qquad (V)$$

where $\delta_p$ = rudder pedal deflection
$V_p$ = air speed
$\phi$ = bank angle The terms appearing on the right-hand side of this equation are summed by summing amplifier 371, shown in FIG. 3.

The signal corresponding to the second term on the right-hand side of Equation V is supplied to the summing point of amplifier 371 by servo-driven potentometers 332, 340, and 351. Sliders 334 and 342 of potentiometers 332 and 340 are both positioned in accordance with air speed, $V_p$, by mechanical interconnections 212, which are in turn driven by servo-motor 35 of air speed servo 31. Slider terminal 338 is excited with 60 cycle alternating potential of approximately 50 volts magnitude and the same instantaneous polarity as the voltage applied to terminal 57 in FIGURE 1; while slider terminal 350 of potentiometer 340 is excited with 60 cycle alternating potential of approximately 50 volts magnitude having the same instantaneous polarity as that of the voltage supplied to terminal 9 in FIGURE 1. The cards of potentiometers 332 and 340 may, in a preferred embodiment, both be "linear" and have overall resistance of 20,000 ohms. Also, a small portion of the lower end of each card is shunted, as shown in FIG. 3, the amount of each card shunted being equal to the equivalent resistive load thereupon, as well known to those skilled in the art, such that the output from the lower terminal thereof will be proportional to the exciting potential applied to the slider, and inversely proportional to the displacement of the slider, while the slider is operated in the unshunted portion thereof. Thus, the signals supplied to the opposite ends of potentiometer 351 by potentiometers 332 and 340, as shown in FIGURE 3, will be inversely proportional to air speed.

Potentiometer 351 is tapped at points 362, 363, and center point 364; and resistors 333 and 361 are bridged across tapping points 362 and 363 and the outer ends of potentiometer 351, respectively. Tapping point 364 is connected directly to ground as shown in FIGURE 3. In the manner well known to those skilled in the art, the location of tapping points 362 and 363 and the values of resistors 333 and 361 are so selected that the output voltage produced at the slider 353 will be proportional to the sine of the angular deflection of slider 353, and inversely proportional to the exciting potential applied to the outer terminals thereof. The exciting potential applied to the outer terminal is, as noted above, inversely proportional to air speed, $V_p$, and slider 353 is displaced proportionally to bank angle $\theta$ by means of mechanical interconnection 244, which is in turn driven by motor 447 of bank angle servo 445. Thus, the output potential appearing on slider 353 will be proportional to the sine of bank angle $\phi$ and inversely proportional to air speed. This potential is supplied to the summing point of amplifier 371 through scaling resistor 370, the value of scaling resistor 370 being so selected as to cause the signal measured at the summing point of amplifier 371 to be 1845 times said signal, i.e., the second term on the right-hand side of Equation V. In a preferred embodiment of the invention potentiometer 351 may be "linear" having an overall value of 10,000 ohms, taps 362, 364, and 363 being made at 60°, 160°, and 260° of the card thereof, respectively. In this embodiment resistors 333 and 361 may be equal to 1,050 ohms. In such case, the value of scaling resistor 370 may be approximately 400,000 ohms.

The signal proportional to the first term on the right side of Equation V is supplied by potentiometers 490 and 494, as shown in FIGURE 3. Slider 491 of potentiometer 490 is positioned by simulated rubber pedals 493 through mechanical interconnection means 492, neither of which need be described here since any such arrangement well known in the art may be substituted in carrying out this invention. Terminals 496 and 497 of potentiometer 490 are excited with 60 cycle alternating potential of approximately 50 volts magnitude, terminal 496 being excited with voltage of the same instantaneous polarity as that applied to terminal 9 in FIGURE 1, while terminal 497 is excited with voltage having the same instantaneous polarity as that of terminal 57 in FIGURE 1. Mechanical interconnection 492 is so arranged that slider 491 will be driven toward terminal 496 by positive (right-turning) rudder pedal deflection. Thus, potentiometer 494 is supplied at its ungrounded end with a potential directly proportional to rudder deflection, $\delta_p$. Slider 495 of potentiometer 494 is positioned in accordance with air speed, $V_p$, by mechanical interconnection 212, which is itself driven by motor M of air speed servo 31. Thus, since slider 495 "picks off" from potentiometer 494 a fraction of the voltage applied thereto which is proportional to air speed, and since the voltage applied thereto is proportional to rudder pedal deflection, the signal appearing on line 380 is proportional both to rudder pedal deflection and to air speed. As will be apparent to those skilled in the art, the proper selection of the values of these potentiometers and scaling resistor 375 will result in a signal directly proportional to the first term on the right-hand side of Equation V being supplied to the summing point of amplifier 371. Then, since signals proportional to the two terms on the right-hand side of Equation V are supplied to the summing point of amplifier 371, the output signal of amplifier 371 will be proportional to rate of turn, $r_a$.

In a preferred embodiment of the instant invention a simulated rate of turn indicator 385 may comprise an electrical meter movement connected by means of leads 384 to the output of a linear phase-detector 383, which is itself coupled through lead 382 directly to the output of amplifier 371. Such linear phase-detectors are well known in the art, and are described, for instance, at pages 383 through 386 of "Electronic Instruments," volume 21 of the Radiation Laboratory Series, McGraw-Hill, 1948.

The heading of the simulated aircraft of the instant invention is continuously determined, and made available in the form of angular position of mechanical interconnecting means 411, by continuously solving the following equation, and continuously integrating its solution by means of servo 410.

$$\dot{\psi} = \frac{r_a}{\cos \phi} \quad (VI)$$

where $\psi$ = heading
$r_a$ = rate of turn

Equation VI is solved continuously by "padded" potentiometer 390, which is supplied through lead 374 with a signal proportional to $r_a$, the numerator of the right-hand side of the equation, from the output of amplifier 371. This $r_a$ signal, as shown in FIGURE 3, is applied to slider 392 of potentiometer 390, which is in turn driven in accordance with bank angle $\phi$, by means of mechanical interconnection 244 to bank angle servo 445. Potentiometer 390 is tapped at points 397, 398, 399, and 400, and these points are shunted as shown in FIGURE 3, resistor 393 being connected between the inner shunts, and an additional resistor 401 being connected between the lower terminal of potentiometer 390 and ground. In a preferred embodiment of the invention the card of potentiometer 390 may have a value of 100,000 ohms, taps 397, 398, 399, and 400, being made at 80°, 142°, 178°, and 240° of the card. In this embodiment resistor 393 may have a value of approximately 7,000 ohms, and resistor 401 may have a value of approximately 4,000 ohms. Thus, as will be apparent to those skilled in the art, the signal produced on output line 402, which is connected to the upper end of resistor 401, will be proportional to the exciting voltage applied to slider 392 and inversely proportional to the cosine of the deflection angle of slider 392, i.e., directly proportional to the rate of turn, $r_a$, and inversely proportional to the cosine of bank angle $\phi$. This signal is supplied through scaling resistor 405 to the summing point of summing amplifier 407 of heading servo 410. In the preferred embodiment described herein resistor 405 may have a value of about 200,000 ohms.

Heading servo 410 is an integrating servo similar in construction and operation to air speed servo 31 of FIGURE 1. The signal supplied on line 402, $\dot{\psi}$, is integrated by this servo, and the output of this servo, appearing as rotation of mechanical interconnecting means 411, is employed to position simulated compass 525.

As will be recognized by those skilled in the art, it is necessary when employing an A.C. tachometer, as is done in heading servo 410, to eliminate the effects of "residual voltage," i.e., unwanted coupling between the stator windings when the rotor is at rest. For balancing out this unwanted "residual voltage" the network shown in the upper right-hand corner of FIGURE 3 is employed in the preferred embodiment of the instant invention. In this network potentiometer 422 may have a value of 1,000 ohms, the two resistors connected from the ends of this potentiometer to ground may have a value of approximately 25 ohms, the resistances connected between the ends of this potentiometer and supply terminals 426 and 428 may have a resistance of approximately 500 ohms, and the supply terminals may have voltages equal in frequency, magnitude, and phase to those applied to terminals 9 and 57 of FIGURE 1, respectively. In such case resistor 415 will have a value of approximately 1 megohm. While the above described network constitutes a convenient means of balancing out the "residual voltage" of the A.C. tachometers used in the A.C. servo herein, it is to be understood that this particular method and means of balancing out the "residual voltages" is not limiting, but merely exemplary. This same supply network is also used to provide balancing voltages for other servos employed in the computing system of the invention, as shown in the upper right-hand corner of FIGURE 3.

The bank angle, $\phi$, of the simulated aircraft of the invention is continuously computed by bank angle servo 445 and its associated input devices, as shown in the lower portion of FIGURE 3, according to the equation:

$$\dot{\phi} = -.00209\delta_w V_p - .0026\delta_p V_p \qquad (VII)$$

where $\delta_w$ = wheel deflection
$\delta_p$ = rudder pedal deflection
$V_p$ = air speed The bank angle servo 445, which integrates the $\dot{\phi}$ signal introduced at its summing point potentiometer 450 and produces output shaft 244 rotations proportional to $\phi$, is an A.C. integrating servo which differs from airspeed servo 31 of FIGURE 1 only in details well known to those skilled in the art. A "residual voltage" balancing potential is introduced to the summing point of amplifier 446 of the bank angle servo by means of line 442 which is connected through scaling resistor 437 to slider 436 of potentiometer 435, which is in turn connected across balancing potential supply network described hereinabove.

The signal proportional to the first term on the right-hand side of Equation VII is supplied by potentiometer 465 and servo-driven potentiometer 485 through scaling resistor 460 to the summing point of amplifier 446. As shown in FIGURE 3, slider 467 of potentiometer 465 is positioned through mechanical interconnecting means by simulated aircraft control wheel 477. Such simulated control wheels and the mechanical means for connecting the same to potentiometers being well known to those skilled in the art, the arrangement of wheel 477 and its mechanical interconnection will not be further described here. Terminal 469 is supplied with alternating potential, the magnitude, frequency, and instantaneous polarity of which is the same as that of the potential supplied to terminal 57 in FIGURE 1. Terminal 470 is supplied with alternating potential, the magnitude, frequency, and instantaneous polarity of which is the same as that of the potential supplied to terminal 9 of FIGURE 1. The mechanical interconnection between wheel 477 and slider 467 is so arranged that positive deflections of the simulated aircraft control wheel will cause slider 467 to be deflected toward terminal 469. As shown in FIGURE 3, one terminal of servo-driven potentiometer 485 is energized with the output signal from slider 467 of potentiometer 465, while the other end of the card of potentiometer 485 is grounded. Slider 486 of potentiometer 485 is positioned in accordance with air speed by means of mechanical interconnection 212, which is itself driven by the servo motor of air speed servo 31. Thus, the signal from slider 486, which is directly connected to scaling resistor 460, is proportional to both air speed and wheel deflection. As will be apparent to those skilled in the art, the constant multiplier of the first term on the right-hand side of Equation VII is introduced by properly selecting the value of scaling resistor 460. In the preferred embodiment described herein scaling resistor 460 may have a value of approximately 500,000 ohms.

The signal proportional to the second term on the right-hand side of Equation VII is supplied by potentiometer 466 and servo-driven potentiometer 487 through scaling resistor 459 to the summing point of amplifier 466. As shown in FIGURE 3, slider 479 of potentiometer 466 is positioned by simulated rudder pedals 474 through mechanical interconnecting means, such simulated rudder pedals and mechanical interconnecting means being well known to those skilled in the art, and requiring no description herein. As shown in FIGURE 3, potentiometers 466 and 465 are both center-tapped and both center taps are grounded. Terminals 475 and 476 of potentiometer 466 are supplied with potentials having the same magnitude, frequency, and instantaneous polarity as those supplied to terminals 469 and 470, respectively. The mechanical interconnection between simulated rudder pedals 474 and slider 479 is so constructed and arranged in the manner well known to those skilled in the art that conventional positive deflection of rudder pedals 474 will cause slider 479 to be moved toward terminal 475. The output from slider 479, as shown in FIGURE 3, is applied to a first terminal of potentiometer 487, while the second terminal of potentiometer 487 is grounded. Slider 488 of potentiometer 487 is positioned in accordance with air speed by mechanical interconnecting means 212, which is itself driven by the servo motor of air speed servo 31 of FIGURE 1. Thus, the output signal supplied by slider 488 to scaling resistor 459 is proportional to rudder pedal deflection and to air speed. As will be apparent to those skilled in the art, the constant multiplier of the second term on the right-hand side of Equation VII will be introduced by proper selection of the value of scaling resistor 459. In the preferred embodiment of the instant invention scaling resistor 459 may have a value of approximately 4 megohms.

Since signals proportional to the two terms of the right-hand side of Equation VII are supplied to the summing point of amplifier 446, it may be seen that a signal proportional to $\dot{\phi}$, is supplied continuously to integrating servo 445, and that the position of output shaft 244 will be at all times proportional to bank angle, $\phi$. In addition to these "airborne" signal components fed to the summing point of amplifier 446, an additional "ground contact" signal is fed to the summing point of amplifier 446 through scaling resistor 459. This "ground contact" signal is of the form $$\frac{-\sin \phi}{V_p}$$

and is derived from slider 353 of potentiometer 351, where it is computed for other purposes described hereinabove. As may be seen in FIGURE 3, lead 373 connects upper terminal 456 of the weight-on-wheels relay system to slider 353. The lower contact 457 of the corresponding group is directly connected to ground. Moving contact 455 is operated by coil 88 of the weight-on-wheels relay as described hereinabove in connection with the operation of several similar groups of relay contacts. It suffices to note at this point that moving contact 455 is maintained at ground through lower contact 457 while the simulated aircraft of the invention is airborne, and is operated to upper contact 456 upon "ground contact" as determined by the operation of the weight-on-wheels relay system described hereinabove. Thus, bank angle servo 445 operates to position its output means 244 in accordance with computed bank angle while the simulated aircraft is airborne, as determined by the weight-on-wheels relay system, and is forced by the signal from slider 353 toward its correct, zero bank, output when "ground contact" is determined by the operation of the weight-on-wheels relay system of FIGURE 1. Scaling resistor 458 may in the preferred embodiment of the instant invention described herein have a value of approximately 500,000 ohms.

As shown in FIGURE 1, a suitable D.C. electrical meter movement may be used to drive a simulated tachometer 510. The operating current for this movement is provided by potentiometer 511, the slider 512 of which is directly driven by mechanical interconnecting means 513, which is in turn driven by simulated throttle 53. As shown in FIGURE 1, one end of potentiometer 511 is grounded, while the other terminal 514 of potentiometer 511 is energized with a suitable D.C. potential which may, in the preferred embodiment, be 300 volts D.C. The provision of suitable adjusting potentiometer means for such a circuit is within the scope of those having ordinary skill in the art, one such arrangement being shown at 515.

A simulated rate-of-climb indicator may be inexpensively and expeditiously provided in the simulator of the instant invention in the manner shown in FIGURE 4. As shown in FIGURE 4, a signal proportional to $\dot{h}$ is supplied on line 116 from the feedback network of the $\gamma$ computing system as described hereinabove. This $\dot{h}$ signal is applied to upper fixed terminal 540 of weight-onwheels relay contacts 540, 541, 542, which are driven by coil 87 of the weight-on-wheels relay described hereinabove in connection with FIGURE 1. Moving contact 541 is actuated by coil 87 of the weight-on-wheels relay 77 so as to be closed to upper contact 540 while the simulated aircraft of the invention is "airborne" and to be closed to ground through lower fixed contact 542 when the simulated aircraft has "touched down." Thus, it will be apparent that the $\dot{h}$ signal from line 116 is supplied over line 545 to the rate of climb indicator actuating circuit shown in the upper portion of FIGURE 4 when the simulated aircraft is "airborne" and not when the simulated aircraft has "touched down." The $\dot{h}$ signal of line 45 is applied through suitable series balancing potentiometer 527 to the input of linear phase-detector 526 of the type described hereinabove. It will be apparent to those skilled in the art that the reference potential of the computer system is applied to linear phase-detector 526, though not shown for reasons of clarity. The output from linear phase-detector 526 which is fed through RC network 528 to the input of time delay balance and detector circuit 529 will be a D.C. signal proportional to $\dot{h}$, the time delay and balance detector circuit 529 serving to produce a suitably delayed D.C. potential of suitable polarity and magnitude across the D.C. meter movement of simulated rate of climb indicator 534. In a preferred embodiment of the instant invention balance detector tube 529 may be a 6SN7, terminal 533 may be supplied with a plus 300 volt D.C. potential, potentiometer 532 may be a linear 10,000 ohm potentiometer, resistors 530 and 531 may be 10,000 ohm resistors, the series potentiometer in circuit with the meter movement of rate of turn indicator 534 may be a linear 250,000 ohm potentiometer, having in series with it and the rate of climb indicator a 100,000 ohm fixed resistor. In this arrangement the RC network comprise a 1 microfarad 528 capacitor and a 3 megohm resistor, the left cathode resistor 536 may have a value of 200 ohms, and the ground resistance of the right-hand grid 535 may have a value of approximately 3 megohms.

A suitable altimeter for employment in a simulator according to the instant invention is shown in FIGURE 4. It is to be understood, however, that the form of altimeter shown there, while highly suitable to carrying out the instant invention, should not be construed as a limiting form of the invention, but merely exemplary. Altitude servo 547, and its associated summing amplifier 546, are similar in construction and operation to air speed servo 31 of FIGURE 1, differing therefrom only in details well known to those skilled in the art. The output from moving contact 511 of the weight-on-wheels relay, as described hereinabove, is introduced to the summing point of amplifier 546 through scaling resistor 543. In addition, a "residual voltage" balancing signal is fed to the summing point of amplifier 546 through scaling resistor 440 over line 544, in the manner and for the reasons fully set forth hereinabove. As will be apparent to those skilled in the art, altitude servo 547 is an integrating servo which constantly integrates the $\dot{h}$ signal supplied on line 116 when the moving contact 541 of weight-on-wheels relay is closed to upper fixed contact 540. Thus, altitude servo 547 constantly integrates all changes of altitude of the simulated aircraft, and so positions its output shaft as to cause simulated altimeter 548 to indicate the altitude of the simulated aircraft at all times.

A suitable ball bank indicator for use in the device of the invention is shown at 571 in FIGURE 4. The associated circuit shown in FIGURE 4 continuously solves the following equation.

$$\lambda = .002705[-.031\delta_p V_p + .000329\delta_w V_p]V_p \quad (VIII)$$

where $\lambda$ = ball deflection angle
$\delta$ = pedal deflection
$\lambda_w$ = wheel deflection
$V_p$ = air speed The first term inside the brackets on the right-hand side of Equation VIII is supplied from slider 495 of potentiometer 494 of FIGURE 3 through scaling resistor 502, the value of which is chosen according to principles well known to those skilled in the art to introduce the constant multiplier $-.031$. Similarly, the signal proportional to the second term inside the brackets on the right-hand side of Equation VIII is supplied by slider 486 of potentiometer 485 of FIGURE 1 through scaling resistor 503, the value of which is so chosen as to introduce the constant multiplier .000329. In the preferred embodiment of the invention as described herein, resistor 502 has a value of approximately 850,000 ohms while resistor 503 has a value of approximately 8 megohms. Thus, a signal proportional to the expression in brackets on the right-hand side of Equation VIII is supplied to the summing point of amplifier 550. This expression is continuously multiplied by the factor .002705 $V_p$ by the operation of the feedback network including potentiometer 562 and scaling resistor 561. Slider 560 of potentiometer 562 is positioned in accordance with air speed by mechanical interconnection means 212, which is itself driven by motor 35 of air speed servo 31 as shown in FIGURE 1. The selection of the value of potentiometer 562, the amount thereof shunted by shunt 563, the value of resistor 564, and the value of scaling resistor 561 to cause the output from amplifier 550 to be at all times equal to the sum of the input signals through scaling resistors 502 and 503 multiplied by the abovementioned factor is within the scope of those having ordinary skill in the art and need not be set forth in detail here. In order to provide suitable direct current for powering simulated ball bank indicator 571, which is of the type well known to those skilled in the art, a phase-sensitive switching circuit is provided at the output of amplifier 550. In this circuit the output of amplifier 550 is applied across center-tapped, grounded resistor 551 and the ends of resistor 551 connected to fixed contacts 552 and 553, respectively, of a "chopper" type switch, the moving contact 554 of which is driven by an alternating magnetic field produced by a coil the terminals 556 and 557 of which are connected across the reference potential supply of the computer. As is well known to those skilled in the art, the phase relation between the alternating current wave produced across resistor 551 and the alternations of moving contact 554 result in a mean D.C. output level supplied through resistor 570 to meter movement 571 which is a function of the phase relationship of the reference voltage supply wave and the voltage wave corresponding to the ball angle $\lambda$ as computed by amplifier 550, its associated feedback network, and potentiometers 494 and 485. Thus, simulated ball bank indicator 571 is supplied with a D.C. potential which continuously and accurately drives it in a realistic manner in accordance with the operation of the controls of the simulated aircraft of the invention.

It will thus be seen that the objects set forth above, among those made apparent from the preceding description, are efficiently attained, and since certain changes may be made in the above constructions without departing from the scope of the invention, it is intended that all matter contained in the above description are shown in the accompanying drawing shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

Having described my invention, what I claim as new and desire to secure by Letters Patent is:

1. Grounded flight training apparatus for simulating the operations of an aircraft, comprising, in combination: a simulated throttle control; first potentiometer means operated by said throttle control and excited by a constant potential for deriving a first potential commensurate with simulated engine thrust; a simulated elevator control; second potentiometer means mechanically connected to be operated by said elevator control to provide a second potential; third potentiometer means connected to modify said second potential to provide a third potential; means for deriving a fourth potential commensurate with flight path elevation angle; an integrating servomechanism responsive to said first, third and fourth potentials for providing an output shaft position commensurate with simulated air-speed, said third potentiometer means being connected to be operated by said output shaft position; and a simulated airspeed indicator connected to be operated by said output shaft position.

2. Apparatus according to claim 1 having an altitude-computing means operative to provide an output quantity commensurate with simulated altitude, and switching means responsive to said output quantity for disconnecting said constant fourth potential from said servomechanism when simulated altitude reaches zero.

3. Apparatus according to claim 1 in which said means for deriving said fourth potential comprises: means for deriving a fifth potential commensurate with simulated pitching rate; bank angle servo means for modifying said fifth potential to provide a sixth potential; fourth potentiometer means responsive to said output shaft position and to said bank angle servo for providing a seventh potential; a second integrating servomechanism responsive to said sixth and seventh potentials for providing a simulated pitch angle shaft position and a simulated pitch angle voltage; means responsive to said bank angle servo and said output shaft position for providing an eighth potential; means responsive to said pitch angle servomechanism and said output shaft position for providing a ninth potential, and potential summing means responsive to said pitching rate voltage and said eighth and ninth potentials for providing said fourth potential.

4. Apparatus according to claim 3 in which said means for deriving said fifth potential comprises means responsive to said output shaft position for providing a simulated airspeed voltage; means responsive to said bank angle servo and said output shaft position for providing a tenth potential; means operated by said simulated elevator control for deriving an eleventh potential; potentiometer means operated by said output shaft position for modifying said eleventh potential to provide a twelfth potential; and means for summing said airspeed voltage and said eleventh and twelfth potentials to provide said fifth potential.

5. Grounded flight training apparatus for simulating the operation of an aircraft, comprising, in combination: a simulated rudder pedals control; first potentiometer means operated by said rudder pedals control to provide a first-potential; an airspeed servo for providing an output shaft position commensurate with simulated airspeed; second potentiometer means connected to be excited by said first potential and positioned by said output shaft position to provide a second potential; a bank angle servo for providing an output shaft position commensurate with simulated bank angle; third potentiometer means operated by said airspeed servo to provide a third potential; fourth potentiometer means excited by said third potential and operated by said bank angle servo to provide a fourth potential; means for summing said second and fourth potentials to provide a fifth potential; and rate of turn indicator means connected to be operated by said fifth potential.

6. Grounded flight training apparatus for simulating the operation of an aircraft, comprising, in combination: a simulated rudder pedal control and a simulated aileron control; an airspeed servomechanism operative to provide an output shaft position commensurate with airspeed; first potentiometer means responsive to operation of said rudder pedals control and said airspeed servomechanism for providing a first potential; second potentiometer means responsive to operation of said aileron control and said airspeed servomechanism for providing a second potential; an amplifier connected to receive said first and second potentials and a third potential and to provide an output potential; a third potentiometer connected to be excited by said output potential and positioned by said airspeed servomechanism to provide said third potential; and a simulated ball-bank indicator connected to be operated by said output potential.

7. Apparatus according to claim 5 including fifth potentiometer means connected to be excited by said fifth potential and mechanically connected to be operated by said bank angle servo for providing a sixth potential; and an integrating servomechanism operative to integrate said sixth potential with respect to time to provide an output shaft position commensurate with simulated heading.

8. Grounded flight training apparatus for simulating the operation of an aircraft, comprising in combination: a simulated rudder pedal control and a simulated aileron control; an airspeed servomechanism operative to provide an output shaft position commensurate with airspeed; first potentiometer means responsive to operation of said rudder pedals control and said airspeed servomechanism for providing a first potential; second potentiometer means responsive to operation of said aileron control and said airspeed servomechanism for providing a second potential; and an integrating servomechanism responsive to said first and second potentials and operative to provide an output shaft position commensurate with simulated bank angle.

9. Grounded flight training apparatus for computing the simulated flight path elevation angle of a simulated aircraft, comprising, in combination: means for deriving a first potential commensurate with simulated pitching rate of the simulated aircraft about its lateral structural axis; means for deriving a second potential commensurate with the angular velocity of the simulated flight path about its lateral axis; means for deriving a third potential commensurate with simulated pitch angle; means for modifying said third potential in accordance with simulated airspeed to provide a fourth potential; an amplifier connected to receive said first, second and fourth potentials and a fifth feedback potential and operative to provide an output potential; potentiometer means connected to be excited by said output potential and positioned in accordance with simulated airspeed to provide said feedback potential, thereby to provide said output potential commensurate with simulated flight path elevation angle.

10. Apparatus according to claim 9 having an integrating servomechanism connected to integrate said feedback potential with respect to time to provide an output shaft position commensurate with simulated altitude; and a simulated altimeter connected to be operated by said output shaft position.

References Cited in the file of this patent

UNITED STATES PATENTS

| | | |
|---|---|---|
| 2,731,737 | Stern | Jan. 24, 1956 |
| 2,842,867 | Dehmel | July 15, 1958 |